Figure 1:
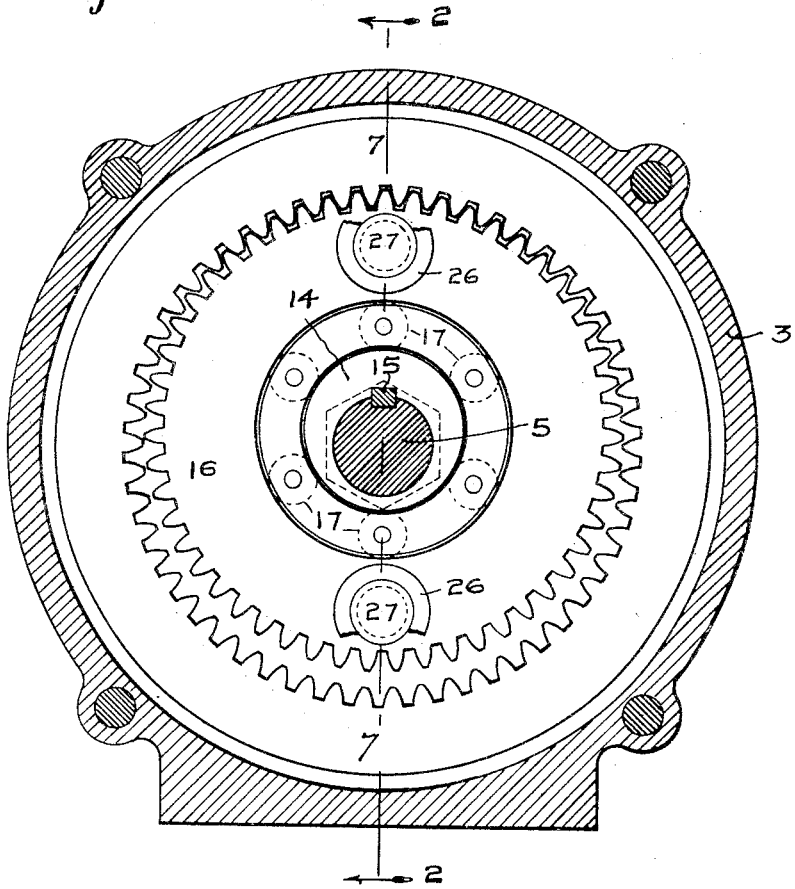

T. J. GRAY.
GEARING.
APPLICATION FILED AUG. 5, 1912.

1,053,909.

Patented Feb. 18, 1913.

6 SHEETS—SHEET 1.

WITNESSES:

INVENTOR.
Thomas J. Gray
BY
Minturn & Woerner,
ATTORNEYS,

T. J. GRAY.
GEARING.
APPLICATION FILED AUG. 5, 1912.
1,053,909.
Patented Feb. 18, 1913.
6 SHEETS—SHEET 3.
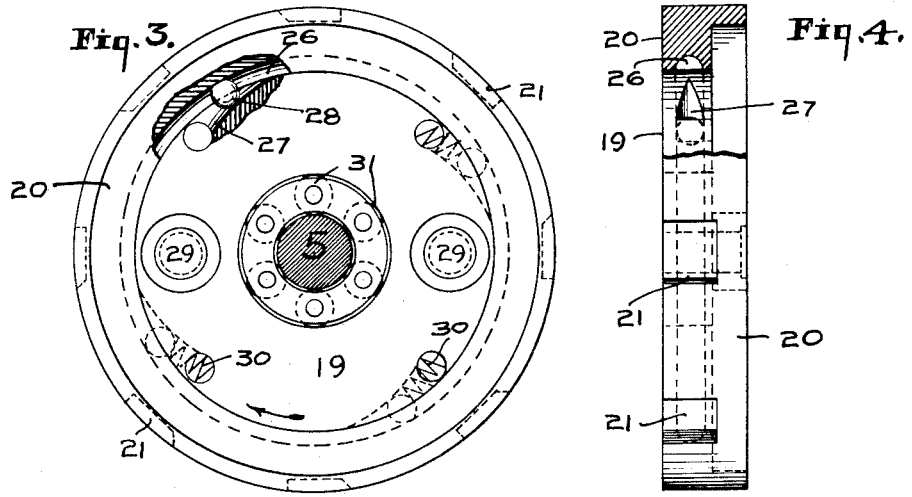
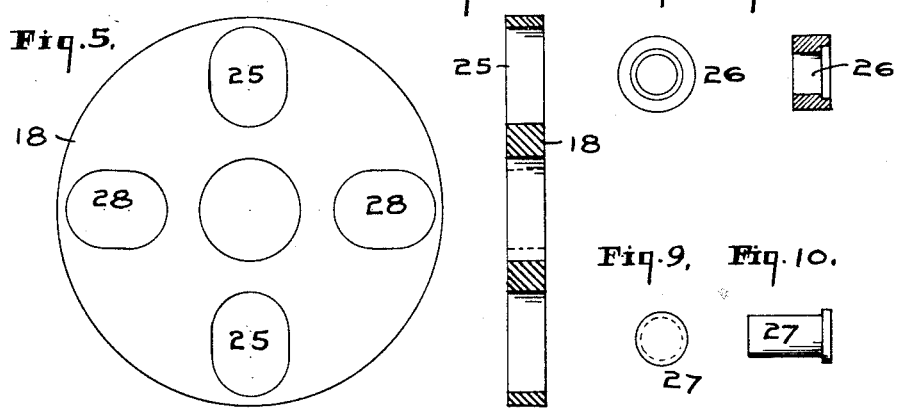
WITNESSES:
INVENTOR.
Thomas J. Gray
BY
ATTORNEY.

T. J. GRAY.
GEARING.
APPLICATION FILED AUG. 5, 1912.
1,053,909.
Patented Feb. 18, 1913.
6 SHEETS—SHEET 4.
Fig. 11.
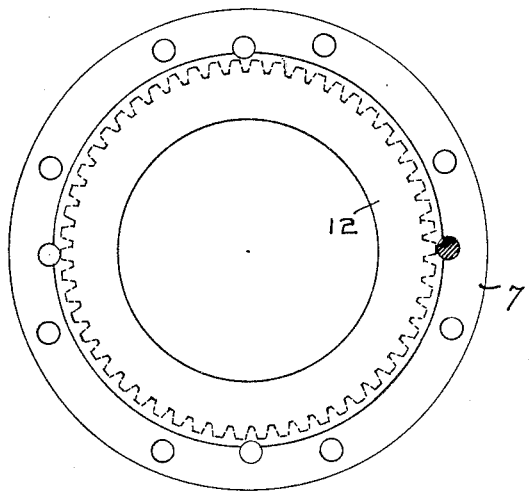
Fig. 12. Fig. 12ª.
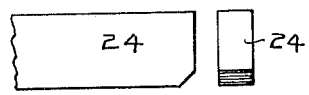
Fig. 13.
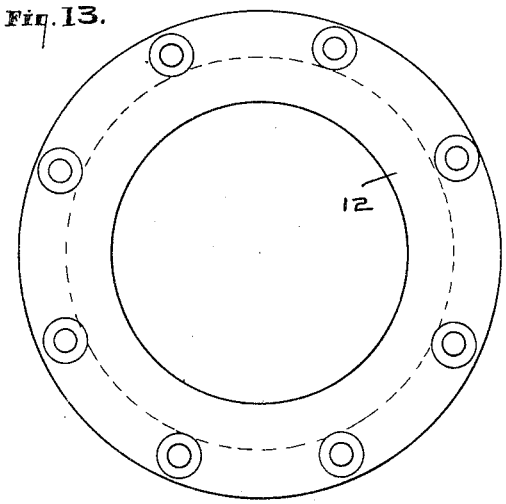
Fig. 14.
WITNESSES:
Claude D. Fletcher
Harry Dempsey
INVENTOR.
Thomas J. Gray
BY
Chas. M. Havell.
ATTORNEY.

T. J. GRAY.
GEARING.
APPLICATION FILED AUG. 5, 1912.

1,053,909.

Patented Feb. 18, 1913.

6 SHEETS—SHEET 5.

WITNESSES:
Claude D. Fletcher
Harry Dempsey

INVENTOR.
Thomas J. Gray
BY Minturn Woerner,
ATTORNEY.

T. J. GRAY.
GEARING.
APPLICATION FILED AUG. 5, 1912.

1,053,909.

Patented Feb. 18, 1913.

6 SHEETS—SHEET 6.

WITNESSES:
Claude D. Fletcher
Harry Dempsey

INVENTOR.
Thomas J. Gray
BY
Minturn Werner
ATTORNEY.

UNITED STATES PATENT OFFICE.

THOMAS J. GRAY, OF INDIANAPOLIS, INDIANA, ASSIGNOR, BY DIRECT AND MESNE ASSIGNMENTS, OF ONE-HALF TO ROBERT C. LIGHT, ONE-EIGHTH TO HENRY N. SPAAN, AND ONE-EIGHTH TO WILLIAM BOSSON, ALL OF INDIANAPOLIS, INDIANA.

GEARING.

1,053,909.  Specification of Letters Patent.  Patented Feb. 18, 1913.

Application filed August 5, 1912. Serial No. 713,428.

*To all whom it may concern:*

Be it known that I, THOMAS J. GRAY, a citizen of the United States, residing at Indianapolis, in the county of Marion and State of Indiana, have invented certain new and useful Improvements in Gearing, of which the following is a specification.

This invention relates to means for starting combustion engines wherein a charge of hydrocarbon is exploded by an electric spark, and the invention has particular reference to automobile construction wherein the crank-shaft is required to be rotated by external means at starting, and wherein it is desirable to provide other than manual means, capable of being utilized for the purpose intended by the throw of a lever or the pressing of a button, and without the chauffeur getting out of the car.

This invention relates to that class of machines wherein an electric motor, supplied with current from a storage battery, is drivingly connected with the engine crank-shaft to start the engine, and the objects to be accomplished are, first, to provide means for reducing the speed of the motor shaft down to a speed which is of practicable application to a crank-shaft at starting, and to provide a device for such purpose which will be strong and durable, and which will be practically noiseless in its movement.

Another object is to provide a reducing mechanism in a compact form so as to be neat in appearance and not be in the way of other mechanism or the occupants of the car.

A further object of the invention is to permit of a reverse movement of the engine due to back firing, without transmitting this reverse movement to the motor and without danger of injury to my reducing mechanism.

Still another object of the invention is to provide means whereby, when the speed of the crank-shaft has attained that of the motor shaft, my device will cease to act as a speed reducer, and its several parts will move as a unit, the same as a solid coupling, to drive the motor from the engine as a current generator to recharge the storage battery which has been drawn upon for electrical energy with which to operate the motor as such up to said moment of change.

I accomplish the above and other objects of the invention by the mechanism illustrated in the accompanying drawings, in which—

Figure 2:
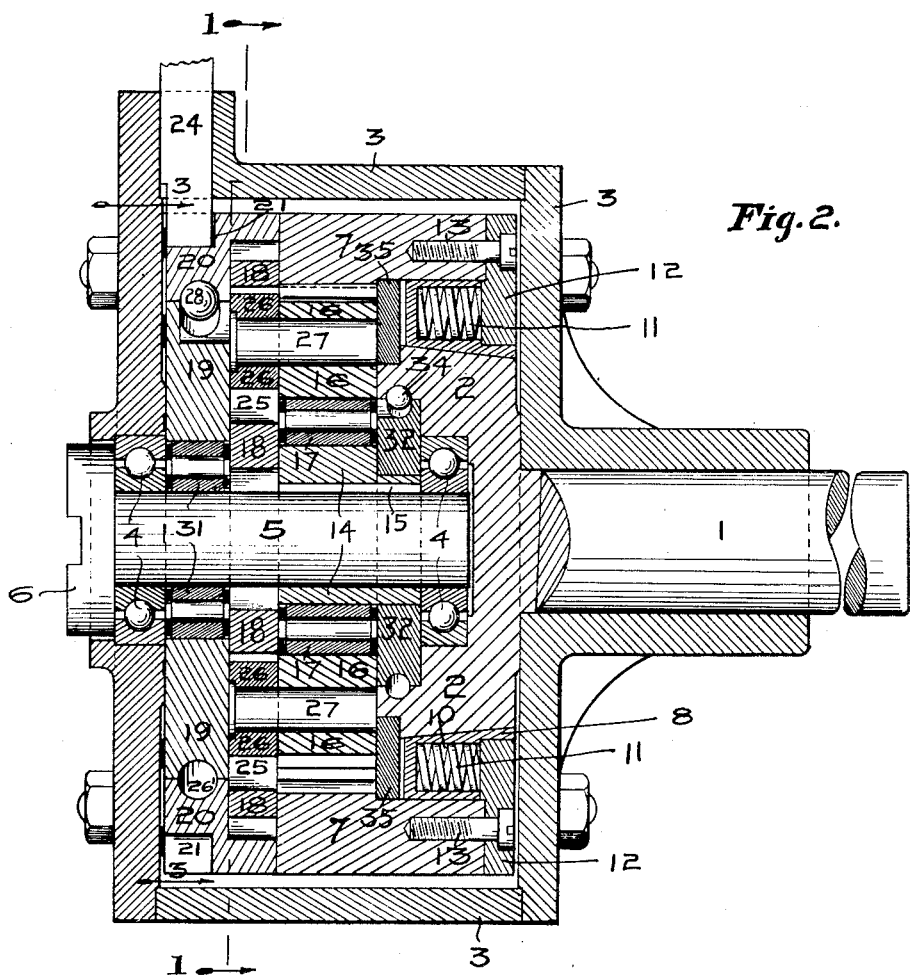
Figure 15:
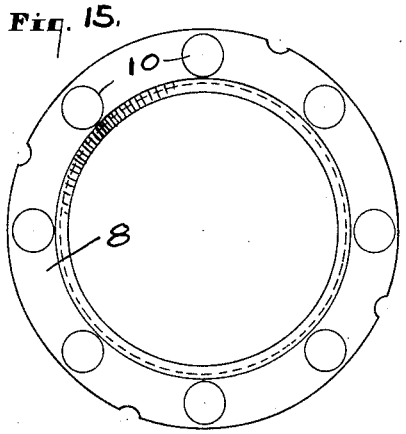
Figure 16:
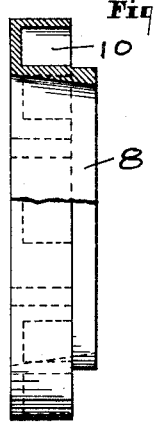
Figure 17:
Figure 18:
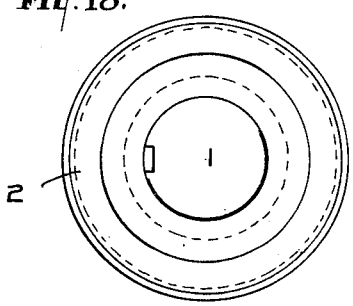
Figure 19:
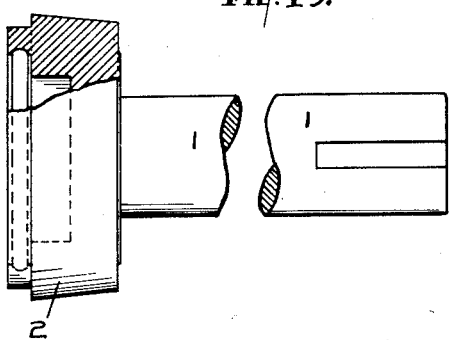
Figure 20:
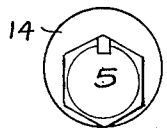
Figure 21:
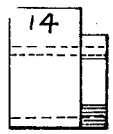
Figure 22:
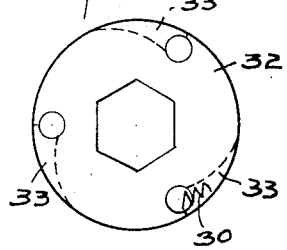
Figure 23:
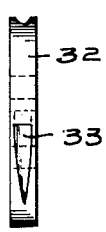
Figure 24:
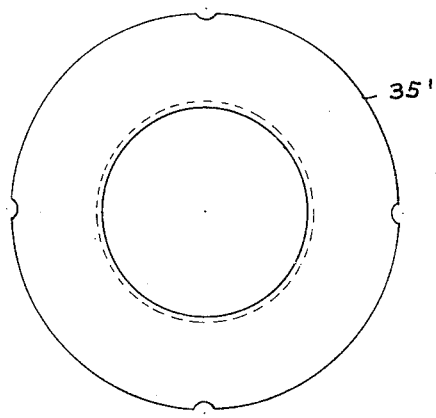
Figure 25:
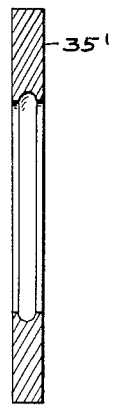
Figure 26:
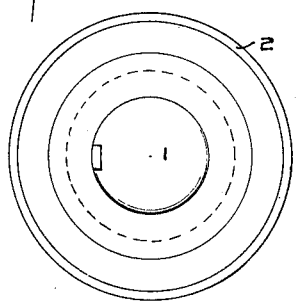
Figure 27:
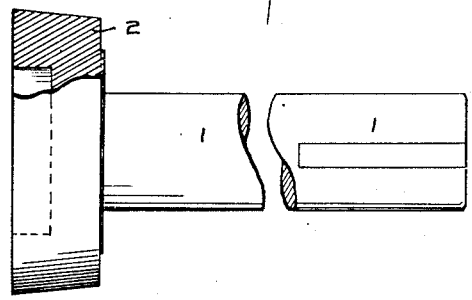

Figure 1 is a transverse section on the line 1—1 of Fig. 2. Fig. 2 is a section axially of the motor and crank-shaft, on the line 2—2 of Fig. 1. Fig. 3 is a view with the casing removed, and in section on the line 3—3 of Fig. 2. Fig. 4 is a view in elevation looking at the periphery of the outside ring shown in Fig. 3, a portion of the ring being sectioned and broken away to show the inner circular plate. Fig. 5 is a side view of the plate with anchors the floating spur-gear wheel. Fig. 6 is a diametrical cross-section of same. Fig. 7 is a side view and Fig. 8 a diametrical cross-section of a friction roller which operates in the radial slots of the plate shown in Figs. 5 and 6, and Fig. 9 is an end view and Fig. 10 a side view of the shaft on which the friction roller, illustrated in Figs. 7 and 8, is mounted. Fig. 11 is a side elevation of the internal gear-wheel of my device as viewed from the side toward the engine, and shows the annular plate which takes the pressure of the crank-shaft hub. Fig. 12 represents a fragment in side elevation and Fig. 12$^a$ an end view of the dog which holds the outer ring-plate shown in Fig. 3. Fig. 13 is a view in side elevation of the abutting plate against which the springs of the ring contacting with the tapering hub of the crank-shaft have their bearing. Fig. 14 is a peripheral and partial section of the plate shown in Fig. 13. Fig. 15 is a side elevation of the annular plate which contacts with the tapering hub of the crank-shaft and shows the socket to receive springs. Fig. 16 is a peripheral elevation and partial section of the plate shown in Fig. 15. Fig. 17 is a side view of one of the springs used in connection with the plates shown in Figs. 15 and 16. Fig. 18 is an elevation of the inner side of the hub on the crank-shaft. Fig. 19 is a side view of the crank-shaft and a peripheral view in partial section of the hub illustrated in Fig. 18. Fig. 20 is a side elevation and Fig. 21 a peripheral elevation of the eccentric which moves the floating gear-wheel. Fig. 22 is a side elevation and Fig. 23 a peripheral elevation of the clutch-ring which assists in automatically connecting the motor shaft and crank-shaft at a predetermined speed of the latter. Fig. 24 is a side elevation and Fig. 25 a peripheral elevation of a modified form of abutting plate between the hub of the driven shaft and spur-gear wheel, and Figs. 26 and 27 show the modified form of the hub when the modified plate is used.

Like characters of reference indicate like parts throughout the several views of the drawings.

Referring to the drawings, 1 represents a shaft which will be connected by a train of gears (not shown) or any other approved means with the crank-shaft of an engine (not shown).

2 is a hub integral with or secured in a fixed manner on the shaft 1.

3 is a housing which is secured in a fixed manner to the engine-bed or frame of the machine, and within which housing the operative parts of my invention are assembled.

Mounted in the housing on ball bearings 4, and projecting into the housing in alinement with the shaft 1 is a shaft 5, having a coupling member 6 on its outer end which is adapted to couple with a corresponding member on the shaft of an electric motor (not shown). The shaft 5 will be hereinafter referred to as the motor shaft extension, and my invention relates particularly to the means for connecting the motor shaft extension 5 in a safe way with the shaft 1, and for reducing the ratio of travel between the shafts 5 and 1 at the time of starting the rotation of shaft 1 from the rapidly rotating motor shaft extension 5.

7 is an internally toothed ring or wheel journaled in the cylindrical bore of the casing 3 and connected by a friction driving device with the hub 2 with sufficient friction to start the engine, with a slight surplus to cover abnormal friction or other contingencies. This connection is to allow the shaft 5 to move in a reverse direction from the ring-gear 7 when so impelled by back firing in the engine, which sometimes occurs, and which without some means of relief like this might produce disastrous results. Except for this requirement to provide for back firing the ring 7 and hub 2 might be integrally formed. In carrying out this feature I give an inwardly oblique taper to the hub 2 and mount a ring 8 with a correspondingly tapered bore, on the hub between the latter and the toothed ring 7. The ring 8 has a series of sockets 10, as shown in Fig. 15, to receive springs 11. The springs 11 are pressed inwardly of their sockets by an abutting plate 12 which is secured to the toothed ring 7 by screws 13. The plate 12 presses the springs 11 with sufficient force to hold the ring 8 in the desired frictional contact with the hub 2.

Mounted on the motor extension 5 is an eccentric wheel 14 which is made to rotate with the shaft 5 by a key 15, and mounted on the eccentric 14 is a spur-gear wheel 16, a portion of the teeth of which are in constant mesh with those of the internal gear ring 7. To relieve the friction between the eccentric and gear 16 I interpose the roller bearings 17. The gear wheel 16 is held from rotation by a plate 18, which, in turn, is held by a ring-plate 19. The ring-plate 19 fits within the bore of a ring 20. The ring 20 has a series of peripheral sockets 21 (see Fig. 3) to receive the end of a dog 24. The sockets 21 have an oblique wall, as shown in Fig. 3, and the end of the dog is beveled to fit the oblique wall of the socket, as shown in Fig. 12, whereby the dog will lock the ring 20 against rotation in one direction, but will permit it to rotate in the opposite direction under suitable stress by forcing the dog out of the socket by contact between the oblique wall of the socket and beveled end of the dog. The dog will be held normally in the socket by any suitable resilient means (not shown).

The plate 18, which is between the gear wheel 16 and ring-plate 19, has radial slots 25, (see Fig. 5) to receive friction rollers 26 mounted on shafts 27 carried by the gear wheel 16. The plate 18 also has the radial slots 28 to receive similar rollers on shafts 29 carried by ring-plate 19 whereby the plate 18 is held against rotation but is adjustable within the limits prescribed by the slots 28. The central opening through the plate 18, through which the motor shaft extension 5 passes, is considerably greater than the diameter of shaft 5 to permit of this unrestricted movement of the plate. This capability of the plate 18 to move in the direction of one of its diameters and the capability of the movement of the spur-gear 16 in the direction of the slot 25 diametrically at right angles to the movement of plate 18 by virtue of slots 28 afford an universal or floating adjustment to the plate 18 while preventing the rotary movement of the latter. This insures the mesh of the requisite proportion of the teeth of the spur-gear 16 with the teeth of the internal gear 7, and as the gear 7 rotates the radial adjustment of the gear 16, above provided for, insures the free action of the two gears without binding when the gear 16 is actuated by the eccentric 14 on the revolving motor shaft extension 5.

The ring-plate 19 is separate from the ring 20 in order to provide for a clutch connection between those parts to permit individual movement in case of the racing of the engine, and they are connected by ball clutches as shown in Figs. 1 and 3. Referring to Fig. 3, it will be seen that the ring 20 has a ball race 26, and the plate 19 has a series of cam pockets 27 to receive balls 28. The ball 28 is held normally out of the bottom of its pocket to make a friction lock between plate 19 and ring 20, by a spring 30. When the engine gets to racing the plate 19 will be carried around in the direction shown by the arrow in Fig. 3 causing the ball to roll down in its pocket 27 overcoming spring 30 and releasing the plate 19 from the ring 20.

The difference in the number of teeth in the spur-gear 16 from the number of teeth in the ring-gear 7 reduces the rate of travel between the motor shaft extension 5 and the driven shaft 1. In the particular construction here shown the difference in tooth number amounts to three teeth, so that with fifty-four teeth in the ring-gear 7 eighteen revolutions will be required of the motor shaft extension 5 to give one revolution to the shaft 1. Friction between the plate 19 and the motor shaft extension 5 is reduced by the roller bearings 31.

When the speed of the engine exceeds that of the motor it is desirable that the shaft 1 and motor shaft extension 5 be coupled together so they will move as a unit, and under those conditions the operative parts of my device thus far described will become inoperative, or will move as a unit, and when this obtains the motor can be driven from the combustion engine to operate as a dynamo or current generator and recharge a storage battery from which the current was supplied to run the motor during the starting of the engine. To this end I provide an automatic coupling between the two shafts comprising a clutch ring 32 mounted on the motor shaft extension 5 (in this case it is mounted on the hub of eccentric 14 which is keyed to shaft 5), and having a series of cam pockets 33 (see Figs. 22 and 23) to receive balls 34. The hub 2 is centrally recessed to receive the ring 32 and has a ball race in this recessed wall wherein the balls 34 in the cam pockets 33 contact. The balls are held normally out by springs in the pockets as in the similar construction between plate 19 and ring 20 already described. When the speed of the shaft 1 exceeds that of the shaft 5 the balls 34 form a lock between the hub 2 and ring 32 mounted on shaft 1 thereby directly coupling the two shafts together and rendering the other parts of the device inoperative. Because of the movement of hub 2 by the action of the spring pressed ring 8 against its beveled periphery toward the adjacent end of shaft 5, I provide an abutment plate 35 against the hub, and provide a bearing for the plate against a suitable shoulder formed in the ring gear 7.

The operation of my device is as follows: It being desired to start shaft 1 which is not moving, from a motor in operation and adapted to be coupled to the shaft 5, the operator will make the coupling connection and thereupon the movement of shaft 5 will be transmitted to the eccentric 14 which will impart a floating travel to the spur-gear 16 and by the toothed engagement of the wheel 16 with the teeth of the internal gear 7, the latter will be rotated once for every eighteen revolutions of the motor shaft extension 5. Should the combustion engine back fire at starting the friction joint between the hub 2 and internal gear 7 will allow for movement between those two parts, and should the engine get to racing it will carry the spur-gear 16 around with the hub 2 and gear 7 by virtue of the ball clutch connection between the plate 19 and ring 20. When the speed of the engine exceeds that of the motor, the latter will be driven by the engine by the coupling together of shafts 1 and 5 by the ball clutches between plate 32 and hub 2 and current may be generated to recharge the storage battery which was drawn upon previously to operate the motor at starting.

In the modification shown in Figs. 24 to 27 inclusive the abutment plate 35' is extended farther toward the axis of the hub 2, and into contact with the ring 32, so as to provide an increased bearing surface against the hub, and in this case the race for the locking balls 34 is formed in the bore of the plate 35'.

While I have described my invention with more or less minuteness as regards details of construction and arrangement and as being embodied in certain precise forms, I do not desire to be limited thereto unduly or any more than is pointed out in the claims. On the contrary I contemplate all proper changes in form, construction, and arrangement, the omission of immaterial elements and the substitution of equivalents as circumstances may suggest or as necessity may render expedient.

I claim:

1. The combination of a driving shaft, an eccentric rotating therewith, a driven shaft, an internal gear wheel secured to the driven shaft, a spur-gear wheel mounted on the eccentric and having teeth engaging the teeth of the internal gear wheel, means to prevent the rotation of the spur-gear wheel under a predetermined rotary speed of the internal gear wheel, said means permitting the rotation of the spur-gear wheel when the rotation of the internal gear wheel exceeds said predetermined speed.

2. The combination of a driving shaft, an eccentric rotating therewith, a driven shaft, an internal gear wheel secured to the driven shaft, a spur-gear wheel mounted on the eccentric and having teeth engaging the teeth of the internal gear wheel, means to prevent the rotation of the spur-gear wheel under a predetermined rotary speed of the internal gear wheel comprising a plate, means to lock the plate to the spur-gear wheel to permit a floating movement of the latter, and means to lock the plate against rotation under normal conditions, said means permitting the rotation of said plate and spur-gear wheel when the rotation of the internal gear wheel exceeds a predetermined speed.

3. The combination of a driving shaft, an eccentric rotating therewith, a driven shaft, an internal gear wheel secured to the driven shaft, a spur-gear wheel mounted on the eccentric and having teeth engaging the teeth of the internal gear wheel, means to prevent the rotation of the spur-gear wheel under a predetermined speed of the internal gear wheel comprising an annular plate locked to the internal gear wheel to permit only a floating movement of the latter, a ring surrounding the annular plate having a ball-race in its inner surface, said plate having cam pockets, balls in said pockets to frictionally lock the plate and ring, and means to lock the ring and to automatically release it above a predetermined resistance.

4. The combination of a driving shaft, an eccentric rotating therewith, a driven shaft, an internal gear wheel secured to the driven shaft, a spur-gear wheel mounted on the eccentric and having teeth engaging the teeth of the internal gear wheel, and means to prevent the rotation of the spur-gear wheel under a predetermined speed of the internal gear wheel comprising a ring, means to lock it and to automatically release it above a predetermined speed, an annular plate mounted within the bore of the ring, a ball lock between the plate and ring to permit independent movement in one direction of the plate and ring, a second annular plate between said first annular plate and the spur-gear wheel, said second plate having radial slots in two diametrical lines at right angles to each other, friction rollers carried by the first plate working in the slots in one diameter of the second plate and like friction rollers from the spur-gear wheel working in the slots of the other diameter of said second plate.

5. The combination of a driving shaft, an eccentric rotating therewith, a driven shaft, an internal gear wheel, means connecting the internal gear wheel with the driven shaft and adapted to release at a predetermined strain on said connecting means, a spur-gear wheel mounted on the eccentric and having teeth engaging the teeth of the internal gear wheel, and means to prevent the rotation of the spur-gear wheel.

6. The combination of a driving shaft, an eccentric rotating therewith, a driven shaft, an internal gear wheel, a friction coupling connecting the internal gear wheel with the driven shaft and adapted to release at a predetermined strain, a spur-gear wheel mounted on the eccentric and having teeth engaging the teeth of the internal gear wheel, and means to prevent the rotation of the spur-gear wheel.

7. The combination of a driving shaft, a driven shaft, means comprising an internal gear wheel on the driven shaft and a floating spur-gear wheel driven from the driving shaft and meshing with the internal gear wheel for driving the driven shaft from the driving shaft at a reduced speed, and means, when the speed of the driven shaft attains the speed of the driving shaft for coupling the two shafts so they will rotate together at uniform speed.

In witness whereof, I have hereunto set my hand and seal at Indianapolis, Indiana, this 29th day of July, A. D. one thousand nine hundred and twelve.

THOMAS J. GRAY. [L. S.]

Witnesses:
F. W. WOERNER,
J. A. MINTURN.